(12) United States Patent
Zinger

(10) Patent No.: US 9,830,809 B2
(45) Date of Patent: Nov. 28, 2017

(54) ELECTRICAL DEVICE CONTROLLER

(71) Applicant: Evan Zinger, Cypress, CA (US)

(72) Inventor: Evan Zinger, Cypress, CA (US)

( * ) Notice: Subject to any disclaimer, the term of this patent is extended or adjusted under 35 U.S.C. 154(b) by 0 days.

(21) Appl. No.: 15/238,338

(22) Filed: Aug. 16, 2016

(65) Prior Publication Data

US 2017/0061785 A1 Mar. 2, 2017

Related U.S. Application Data

(60) Provisional application No. 62/212,087, filed on Aug. 31, 2015.

(51) Int. Cl.
*G08C 19/02* (2006.01)
*G08C 17/02* (2006.01)
*H04L 27/26* (2006.01)

(52) U.S. Cl.
CPC ............ *G08C 19/02* (2013.01); *G08C 17/02* (2013.01); *H04L 27/2601* (2013.01)

(58) Field of Classification Search
CPC ........ G08C 17/02; G08C 19/12; G08C 15/04; G08C 15/10; G08C 17/00; G08C 17/04; G08C 19/18; G08C 2201/20; G08C 2201/31
USPC ...................................................... 340/13.2
See application file for complete search history.

(56) References Cited

U.S. PATENT DOCUMENTS

| | | | |
|---|---|---|---|
| 2,855,816 A | 10/1958 | Olson et al. | |
| 4,000,679 A | 1/1977 | Norman | |
| 4,265,159 A | 5/1981 | Liebman | |
| 5,227,781 A * | 7/1993 | Ninnis | H03K 17/102 340/14.2 |
| 5,461,188 A | 10/1995 | Drago et al. | |
| 8,265,291 B2 * | 9/2012 | Bridger | A61B 7/04 381/423 |
| 8,269,646 B2 | 9/2012 | Exman | |
| 8,656,081 B2 * | 2/2014 | Irizarry | G05B 19/042 710/241 |
| 2013/0023962 A1 * | 1/2013 | Stafford | A61N 5/0622 607/88 |
| 2015/0095054 A1 * | 4/2015 | Kaigler | G06F 19/3418 705/2 |

* cited by examiner

*Primary Examiner* — Mark Blouin
(74) *Attorney, Agent, or Firm* — Chen Huang; Adli Law Group P.C.

(57) ABSTRACT

The present disclosure generally relates to an electrical device controller comprising a signal input module for receiving an audio signal, a signal analyzer for breaking the audio signal into individual frequency components and determining each of the individual frequency components' magnitude, a processor for generating control signals based on the individual frequency components' magnitudes and a control signal output module for outputting the control signals to a power supply unit. The power supply unit comprises a plurality of electrical switches and the plurality of electrical switches are being activated or deactivated based on the control signals.

9 Claims, 3 Drawing Sheets

ELECTRICAL DEVICE CONTROLLER

CROSS-REFERENCE TO RELATED PATENT APPLICATIONS

Embodiments of the present invention relate to U.S. Provisional Application Ser. No. 62/212,087, filed Aug. 31, 2015, entitled "ELECTRICAL DEVICE CONTROLLER", the contents of which are incorporated by reference herein in its entirety and which is a basis for a claim of priority.

FIELD OF THE INVENTION

Embodiments of the present disclosure generally relate to an electrical device controller and more specifically to an electrical device controller that controls the activation or deactivation of plural electrical switches based on an input audio signal.

BACKGROUND

Conventional audio based power switch controllers are usually limited to only being able to control one type of device (e.g., a light bulb). This is because the signal analyzing circuitry is directly wired to the device. Different types of electrical devices require different circuitry and once a design is finalized, it cannot be changed. For example, a motor cannot be controlled by circuit design specifically for a light.

In addition, conventional "color organ" device (electromechanical devices built to represent sound or to accompany music in a visual medium) generally use circuitry (usually bandpass and peak detector circuits) to separate the different frequencies in an analog signal and the frequencies selected cannot be changed once the design is finalized.

Accordingly, there exists a need for an improved electrical device control that uses a microprocessor to control switches so that a variety of different electrical devices are compatible by simply altering the control signals from the controller. This allows different devices to be controlled with the same frequency data. Using a microprocessor also allows for extreme flexibility when it comes to frequency data gathering; for example, and not by way of limitation, using algorithms (FFT), receiving data from a DSP, or reading a bandpass and peak detector circuit. These methods are also more reliable and accurate when compared to previous color organ type devices.

Further, previous devices were also designed as a single piece of hardware. An advantage of present disclosure is that the disclosed electrical device controller modular system comprises separate components and different communication techniques can be used at different points in the system. Hardwired or wireless (Wi-Fi, Bluetooth, etc) communication can be used to transmit the audio signal from the audio source to the controller or to transmit control signals from the controller to the switches. The use of switches in present disclosure also offers isolation of the different electrical components. The microprocessor operates on low DC voltage, but the isolation allows the control signals to control 120 V AC devices. The switches can also control battery operated devices.

Other conventional electrical device controllers may specify mechanical switches to control the peripheral devices. Those mechanical switches use a magnetic field to switch on and off and are slow and require a lot of power to operate. But with the new technology of Solid State Relays as the potential switches in the present disclosure, there is virtually no limit on switch toggling speed, and the control signals can be low power.

SUMMARY OF THE DISCLOSURE

The major objective of the present disclosure is to provide an electrical device controller that activates and/or deactivates multiple electrical switches based on an input audio signal, where the electrical switches control the power delivered to a plurality of electrical devices such as lights, lasers, fog machines, etc. from a power supply.

Another objective of the present disclosure is to provide an electrical device controller that allows a user to provide inputs to manipulate the control signals of the electrical device controller beyond the default operation.

In summary, the electrical device controller of the present disclosure uses a microprocessor that either controls an integrated circuit that takes an incoming audio signal and analyzes it and returns to the microprocessor the magnitude of each individual frequency component of the audio signal, or running an FFT algorithm to yield the magnitude of each individual frequency component of the audio signal. The microprocessor then generates control signals based on the magnitude of each individual frequency component of the audio signal and sends the control signals to multiple electrical switches (e.g., relays) to turn them ON or OFF based on the control signal or the frequency data (e.g. when the bass frequency hits, lights plugged into relay tied to the bass turns on). In addition, there are software functions that can be loaded to the electrical device controller to alter the control signals, allowing the controlling of different electrical devices. Different types of electrical appliances (motors versus lights versus electromechanical) can be autonomously operated via the switches by using different control signals for each switch, based on what type of electronics are connected to the particular switch.

The foregoing and other objects, features and advantages of the present invention are more readily apparent from the detailed description of the preferred embodiments set forth below, taken in conjunction with the accompanying drawings.

DETAILED DESCRIPTION OF PREFERRED EMBODIMENTS

The following description is not to be taken in a limiting sense, but is made merely for the purpose of illustrating the general principles of the invention, since the scope of the invention is best defined by the following claims. Various inventive features are described below that can each be used independently of one another or in combination with other features.

Broadly, embodiments of the present disclosure generally provide an intelligent electrical device controller system that controls the activation/de-activation of multiple electrical switches (such as relays) that bridge electrical devices such as lights, lasers, fog machines or combination thereof etc. to a power supply. The software algorithms ran by the processor of the system send control signals to the multiple electrical switches based on data gathered by analyzing an incoming analog audio signal. Any type of electrical device can be connected to the electrical switches.

Figure 1:
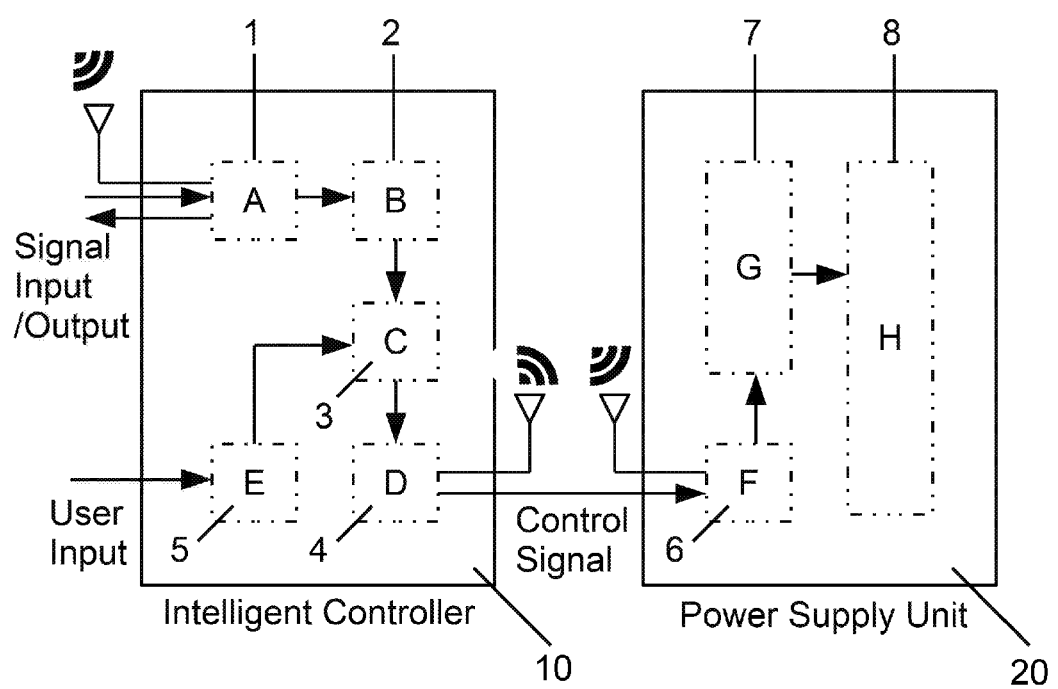
FIG. 1 is a schematic diagram showing an exemplary embodiment of the present invention.

In accordance with one aspect of at least one embodiment of the present disclosure, as shown by FIG. 1, the disclosed electrical device controller primarily comprises two parts: an intelligent controller 10 and a power supply unit 20.

The intelligent controller 10 comprises a signal input module 1 for receiving an audio signal, a signal analyzer 2 for breaking the audio signal into individual frequency components and determining each of the individual frequency components' magnitude, a processor 3 for generating control signals based on the individual frequency components' magnitudes and a control signal output module 4 for outputting the control signals to the power supply unit 20. Optionally, the intelligent controller 10 can further include a user input interface 5 for allowing a user to manipulate the operation of the electrical device controller and/or a signal output module that outputs the analog audio signal in its original form.

The power supply unit 20 comprises a control signal input module 6 for receiving the control signal from the intelligent controller 10, a plurality of electrical switches 7 and an electrical power interface 8. Where the plurality of electrical switches are being activated or deactivated based on the control signals. Optionally, intelligent controller 10 can further comprise a user input interface.

Below are detail explanations for each component in the intelligent controller 10 and the power supply unit 20.

Intelligent Controller 10:

(A) Signal Input Module 1/Signal Output Module

This is the medium/module by which an analog signal or an audio signal is received by and optionally transmitted from the intelligent controller 10. The audio signal can be received through a hard-wire (headphone jack, RCA, etc.) or a wireless receiver (Bluetooth, Wi-Fi, etc.). Optionally, there can be an additional signal output module on the intelligent controller 10 which allows the intelligent controller 10 to be a "pass-through" device; meaning the same analog signal that goes into the intelligent controller 10 to be analyzed, can also be outputted to other system or device in its original form such as a speaker system that is playing the music; thereby eliminating the need for parallel wiring in order to still actually listen to the music from speakers.

(B) Analog Signal Analyzer 2

This is the medium/module that takes the incoming composite analog signal, breaks it up into its individual frequency components, determines the magnitude of each individual frequency component, and then feeds the data to the microprocessor 3. The analog signal analyzer 2 can either be a hardware based circuitry (i.e. filtering circuits and peak detectors) or software (i.e. Fast Fourier Transformation (FFT) running on the microprocessor 3 or on a dedicated Digital Signal Processor (DSP) within the intelligent controller 10 architecture.

(C) Processor/Microprocessor 3

The microprocessor 3 is programmed with a software and, among other things, is used to control the signal analyzing component of the system such as the analog signal analyzer 2 and/or to perform the signal analyzing itself with FFT. In addition, the microprocessor 3 reads the user input signals from user input 5, if any. Once the microprocessor 3 receives the individual frequency components, it turns them into control signals and sends the control signals, either directly or through control signal output interface 4, to the power supply unit 20.

In one embodiment of the present disclosure, the signal analysis portion of the system (the analog signal analyzer 2 and/or microprocessor 3) performs the function of breaking down the composite analog signal into each of its individual frequency components and determines each frequency's magnitude. This happens in real time as the signal is played into the intelligent controller 10. There are at least two ways to achieve this, such as by hardware, software or the combination of both hardware and software.

To achieve the function of breaking down the composite analog signal into each of its individual frequency components and determines each frequency's magnitude by hardware, multiple variations of low-pass, band pass, and high pass filter circuits are combined to create a spectrum of specific frequencies that can be detected. Each filter isolates a calculated frequency based on the values used for the resistors, capacitors, and inductors. Each individual and isolated frequency is then passed to a peak detector circuit (e.g., a circuit composed of a comparator and supporting components) which determines the magnitude of the incoming frequency signal. Each frequency component's magnitude is fed to the microprocessor.

To achieve the function of breaking down the composite analog signal into each of its individual frequency components and determines each frequency's magnitude by software, software based signal analysis is performed with the Fast Fourier Transform (FFT) algorithm. With this software method, the analog signal is sent into an ADC (analog to digital converter). The FFT will yield the magnitude of each frequency component detected in real time. The FFT can either be performed by the same main microprocessor 3 that is controlling everything else in the system, or the audio signal can be sent through a dedicated DSP (digital signal processor) and then the results of the FFT are sent to the microprocessor 3 from the DSP.

(D) Control Signal Output Interface 4

This is the medium/module/interface that sends control signals to the power supply unit 20. Either through a wired connection (e.g., Ethernet, etc.), or a wireless connection (e.g., Bluetooth, Wi-Fi, etc.).

(E) User Input 5 (Optional)

The optional user input 5 can be in the form of switches, buttons, sensors, etc. that are "read" by the microprocessor 3. The user input 5 allows a user to provide inputs to the intelligent controller 10 to manipulate the operation of the electrical controller device in various and creative ways; such as changing how the incoming signal is analyzed or changing the control signals that the microprocessor 3 sends to the power supply unit 20.

While the system can run in autonomously a default configuration, a varying number of user controlled inputs can be used to manipulate many aspects of the system at run time. For instance, and not by way of limitation, the user input notifies the controller what type of electrical device is connected to a certain switch so the correct "control protocol" is used. For example, a motor needs more steady and less sporadic control than a light which can be turned on and off very rapidly. The user input also allows a user to select how many and which frequencies to collect data on. For example, different genres of music use different instruments and utilize different frequencies. This also allows the user to select what control signals to send based on the frequency data. For example, an input can dictate whether a switch is toggled ON and OFF quickly or left permanently ON if a certain frequency is present. The user can further manipulate the control signals beyond just the frequency data. For example, a user input being activated may make it so that when no signal is detected (all frequency data is zero or very low), the controller controls the switches in a predetermined pattern.

In yet another embodiment of the present disclosure, once the frequency data is acquired by the microprocessor 3, the software algorithms decide what control signals to send to the power supply unit 20 based on the data. The microprocessor 3 can use musical data to drive the electrical switches 7 (e.g., relays) in a way that intricately synchronizes the visual effects to the music (capable of going deeper than just one beat turning on one light). As such, different effects and data manipulation techniques can be selected via inputs to the intelligent controller 10. For example, the inputs can dictate what specific frequencies are used, manipulate relay activation patterns/assignments, etc.

The disclosed electrical device controller turns on a corresponding electrical switch when a certain frequency component's magnitude is above a certain threshold. What frequencies are analyzed and what electrical switches (e.g., relays) turn on for what frequency can be controlled by the user inputs 5 and/or be integrated into the controller. There is also a default mode that the system runs in without the need for user input.

In yet another embodiment of the present disclosure, at least two user inputs can be read by the microprocessor 3 to alter the control signals and therefore the perceived visuals. For example, and not by way of limitation, one user input changes the number of frequency ranges that are analyzed and the other user input changes which electrical switch the different frequencies are tied to.

Power Supply Unit 20

(F) Control Signal Input Interface 6

This is the medium/module/interface that receives the control signals from the intelligent controller 10 through wires or wirelessly.

(G) Electrical Switches 7

Figure 2:
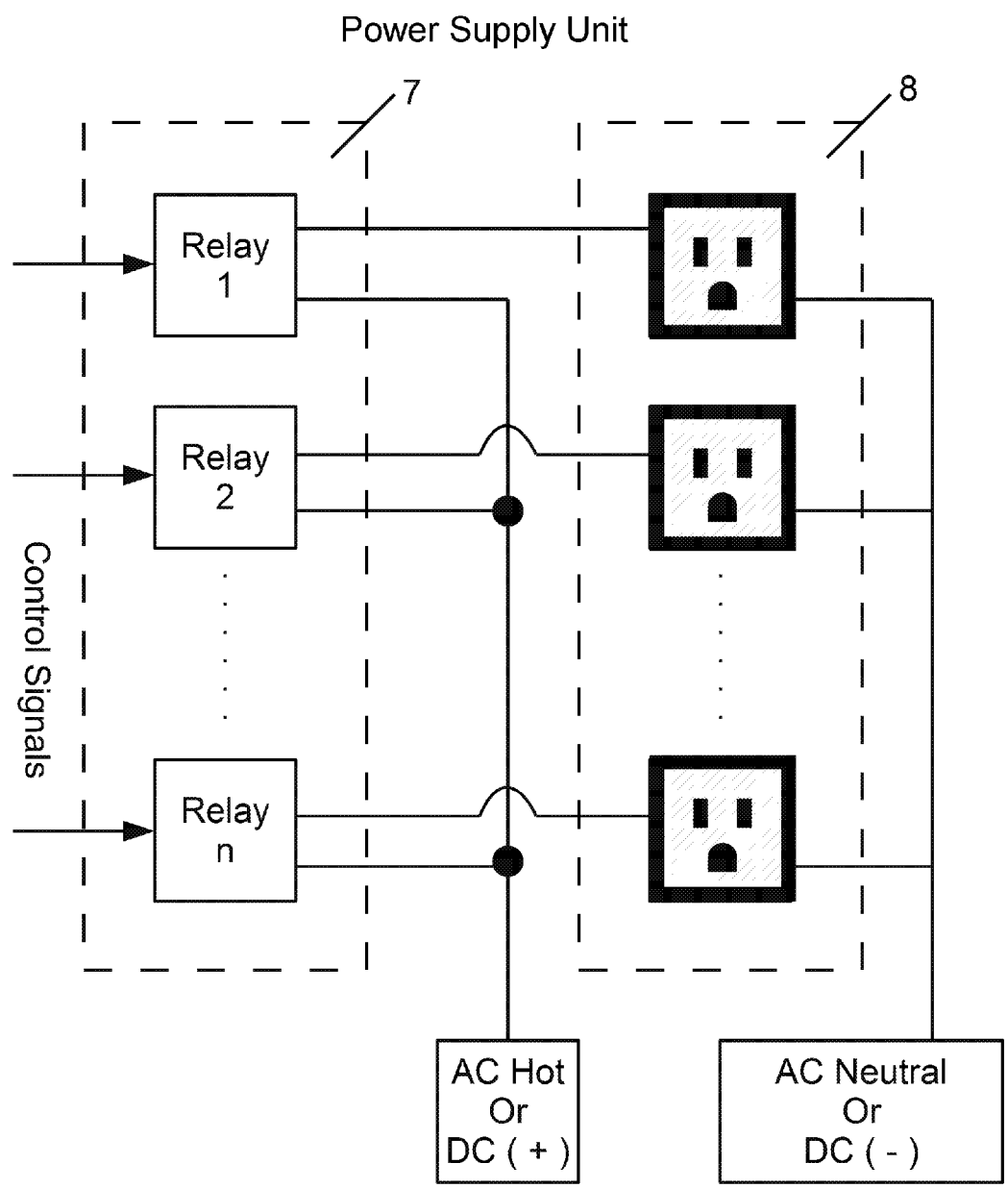
FIG. 2 is a schematic diagram showing an exemplary embodiment of the present invention.

As shown in FIG. 2, the electrical switches 7 are switches that can be activated and de-activated based on the control signals received from the intelligent controller 10. The electrical switches can be transistors, MOSFETs, relays or anything that can control the ON and OFF of a power source (AC and/or DC power source). The use of switches (such as relays) creates isolation of electrical components, i.e. keeping the low voltage, DC circuitry of the controller isolated from the higher voltage power supply which can be powering either AC or DC electronics. Also, by using fast-switching relays such as Solid State Relays, there is no switching-speed restrictions that exist when using magnetically driven, mechanical relays.

(H) Electrical Power Interfaces 8

This is the medium/module/interface that connects any number of electrical devices (e.g., lights, sirens, lasers, etc.) to the power supply unit 20 (i.e. 3-prong power receptacles [wall outlets], or batteries).

Since the electrical switches are controlled by the microprocessor 3 through control signals, any electrical device can be plugged into the electrical switches through the electrical power interface 8. The software used by the processor 3 can be coded to control each type of electrical device differently. For example, and not by way of limitation, lights can be switched ON and OFF at a very fast rate, so the microprocessor can turn an electrical switch with lights connected to it ON and OFF just as quickly as the music can fluctuate, but a motor cannot be turned on and off at a very fast rate, so the software knows that relays with motors connected to them need longer "activated" duty cycle times and also activation is controlled by different patterns in the musical data. Different effects can be optimized for different devices.

In yet another embodiment of the present disclosure, the microprocessor is programmed to identify what type of hardware is connected to each electrical switches based on an input signal, a user input via switches or buttons, a signal from the hardware itself, or an outlet can be pre-determined to be used with a certain type of hardware.

Figure 3:
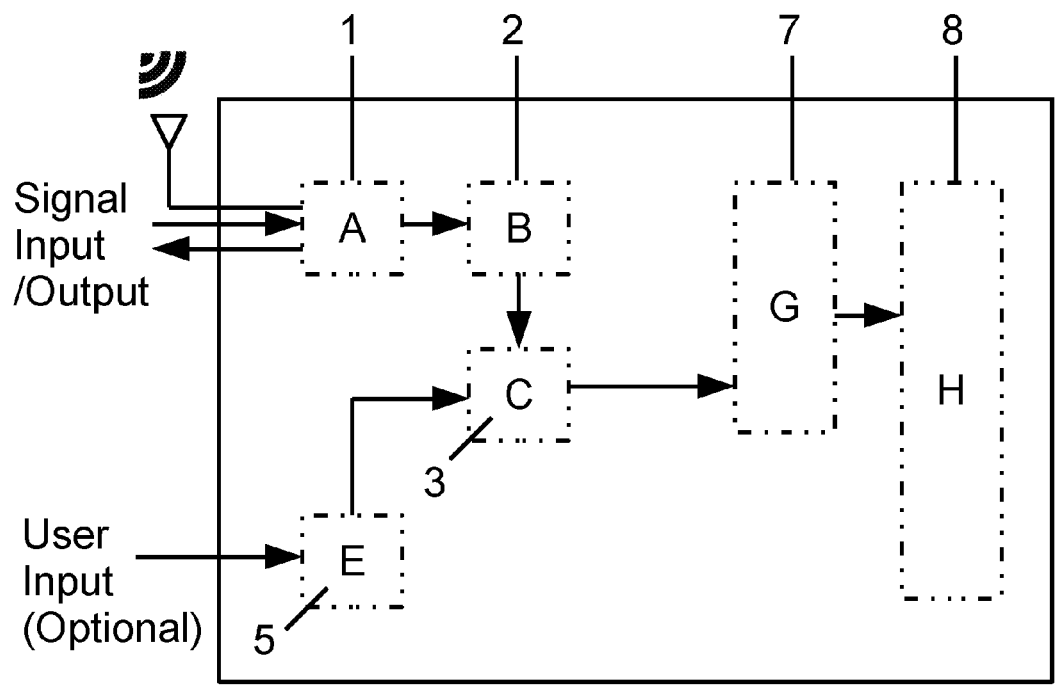
FIG. 3 is a schematic diagram showing an exemplary embodiment of the present invention.

Alternatively, the electrical device controller of the present disclosure can also be designed in a way that both the intelligent controller and the power supply are consolidated into a single unit as opposed to two separate hardware pieces. For example, as shown by FIG. 3, the disclosed electrical device controller primarily comprises a signal input module 1 for receiving an analog audio signal; a signal analyzer 2 for breaking the analog audio signal into individual frequency components and determining each of the individual frequency components' magnitude, a processor 3 for generating digital control signals based on the individual frequency components' magnitudes, a plurality of electrical switches 7 for controlling power delivered to a plurality of electrical devices from a power source, wherein the plurality of electrical switches 7 are being activated or deactivated based on the digital control signal, and an electrical power interface 8 for bridging the plurality of electrical devices to the power source. Optionally, the electrical device controller in this embodiment can further include a signal output module that outputs the analog audio signal in its original form and/or a user input interface as discussed above. The power is supplied to the plurality of electrical devices from the power source when their corresponding electrical switches are activated and the power is withdrawn from the plurality of electrical devices when their corresponding electrical switches are deactivated.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. An electrical device controller comprising:
   an analog signal input module for receiving an analog audio signal;
   an analog signal analyzer for breaking the analog audio signal into individual frequency components and determining each of the individual frequency components' magnitude;
   a processor for generating digital control signals based on the individual frequency components' magnitudes;
   a signal output module that outputs the analog audio signal in its original form;
   a plurality of electrical switches for controlling power delivered to a plurality of electrical devices from a power source, wherein the plurality of electrical switches are being activated or deactivated based on the digital control signal; and
   an electrical power interface for bridging the plurality of electrical devices to the power source.

2. The electrical device controller of claim 1, wherein the power is supplied to the plurality of electrical devices from the power source when the plurality of electrical devices' corresponding electrical switches are activated and withdrawn from the electrical devices when their corresponding electrical switches are deactivated.

3. The electrical device controller of claim 1, wherein the analog signal analyzer is a hardware based circuitry that comprises a plurality of filtering circuits and a peak detector circuit, where each of the plurality of filtering circuits isolates a calculated frequency of the analog audio signal and passes the isolated frequency to the peak detector circuit which determines the isolated frequency's magnitude.

4. The electrical device controller of claim 1, wherein the signal analyzer is a software based signal analyzer that determines each of the individual frequency components' magnitude using Fast Fourier Transform (FFT) algorithm running on the processor or on a dedicated Digital Signal Processor (DSP).

5. The electrical device controller of claim 1 further comprises a user input interface allowing a user to manipulate the operation of the electrical device controller, wherein the user input interface comprises switches, buttons, sensors or combination thereof that send signals to the processor and control the processor.

6. An electrical device controller comprising:
   an analog signal input module for receiving an analog audio signal;
   an analog signal analyzer for breaking the analog audio signal into individual frequency components and determining each of the individual frequency components' magnitude;
   a processor for generating digital control signals based on the individual frequency components' magnitudes;
   a user input interface for allowing a user to manipulate the processor;
   a signal output module that outputs the audio signal in its original form;
   a plurality of electrical switches for controlling a power delivered to a plurality of electrical devices from a power source, wherein the plurality of electrical switches are being activated or deactivated based on the digital control signal;
   an electrical power interface for bridging the plurality of electrical devices to the power source;
   wherein the user input interface comprises switches, buttons, sensors or combination thereof that send signals to the processor and control the processor; and
   wherein the power is supplied to the plurality of electrical devices from the power source when their corresponding electrical switches are activated and the power is withdrawn from the plurality of electrical devices when their corresponding electrical switches are deactivated.

7. The electrical device controller of claim 6, wherein the analog signal analyzer is a hardware based circuitry that comprises a plurality of filtering circuits and a peak detector circuit, where each of the plurality of filtering circuits isolates a calculated frequency of the analog audio signal and passes the isolated frequency to the peak detector circuit which determines the isolated frequency's magnitude.

8. The electrical device controller of claim 6, wherein the signal analyzer is a software based signal analyzer that determines each of the individual frequency components' magnitude using Fast Fourier Transform (FFT) algorithm running on the processor or on a dedicated Digital Signal Processor (DSP).

9. The electrical device controller of claim 6, wherein the plurality of electrical devices are lights, lasers, sirens, fog machines or combination thereof.

* * * * *